(12) United States Patent
Ichikawa et al.

(10) Patent No.: US 8,643,916 B2
(45) Date of Patent: Feb. 4, 2014

(54) READING DEVICE

(75) Inventors: Hirokazu Ichikawa, Kanagawa (JP); Yoshiro Yamaguchi, Kanagawa (JP); Eigo Nakagawa, Kanagawa (JP); Jiro Matsuda, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 71 days.

(21) Appl. No.: 13/481,175

(22) Filed: May 25, 2012

(65) Prior Publication Data

US 2013/0120808 A1 May 16, 2013

(30) Foreign Application Priority Data

Nov. 11, 2011 (JP) ................................. 2011-247902

(51) Int. Cl.
*H04N 1/04* (2006.01)

(52) U.S. Cl.
USPC ............................ 358/475; 358/474; 358/509

(58) Field of Classification Search
USPC .......... 358/475, 474, 509, 496, 497, 483, 482
See application file for complete search history.

(56) References Cited

U.S. PATENT DOCUMENTS

| | | | | |
|---|---|---|---|---|
| 6,885,411 B2* | 4/2005 | Ogawa et al. | ................... | 349/58 |
| 7,136,203 B2* | 11/2006 | Yokota et al. | ................ | 358/484 |
| 7,742,202 B2* | 6/2010 | Higashitani | ................... | 358/484 |
| 7,920,304 B2* | 4/2011 | Tatsuno et al. | ................ | 358/475 |
| 7,940,433 B2* | 5/2011 | Onishi et al. | ................... | 358/484 |
| 8,174,734 B2* | 5/2012 | Inukai | ........................... | 358/448 |
| 8,218,205 B2* | 7/2012 | Nagatani et al. | .............. | 358/475 |
| 8,228,568 B2* | 7/2012 | Yoshimoto et al. | ........... | 358/475 |
| 8,383,330 B2* | 2/2013 | Mino et al. | ..................... | 430/397 |
| 8,419,227 B2* | 4/2013 | Nakayama | .................... | 362/301 |
| 8,446,646 B2* | 5/2013 | Yamaguchi et al. | .......... | 358/474 |
| 8,488,216 B2* | 7/2013 | Sakamoto et al. | ............ | 358/475 |
| 8,537,434 B2* | 9/2013 | Takahashi et al. | ............ | 358/475 |

FOREIGN PATENT DOCUMENTS

| JP | 2007-19853 A | 1/2007 |
|---|---|---|
| JP | 2009-141580 A | 6/2009 |

* cited by examiner

*Primary Examiner* — Negussie Worku
(74) *Attorney, Agent, or Firm* — Sughrue Mion, PLLC

(57) ABSTRACT

A reading device includes a first illuminating section that illuminates a reading area with first illumination light of a first direction; a second illuminating section that illuminates the reading area with second illumination light of a second direction; a light-receiving section that receives reflection light of the first illumination light and reflection light of the second illumination light reflected from the reading area, the first illumination light being applied from the first illuminating section and the second illumination light being applied from the second illuminating section; and reflecting members that are disposed side by side in the reading area in a widthwise direction thereof, and that have first and second reflecting surfaces.

12 Claims, 9 Drawing Sheets

READING DEVICE

CROSS-REFERENCE TO RELATED APPLICATIONS

This application is based on and claims priority under 35 USC 119 from Japanese Patent Application No. 2011-247902 filed Nov. 11, 2011.

BACKGROUND (i) Technical Field

The present invention relates to a reading device.

(ii) Related Art

A reading device reads an image formed on a medium by irradiating the medium with light and detecting reflected light. The quantity of light with which the medium is irradiated may vary depending upon the external environment, such as temperature, individual differences, and types of light sources. Therefore, technologies that, in accordance with the variation in the light quantity, vary the amount of energy supplied to the light source or correct a read image are being developed.

SUMMARY

According to an aspect of the invention, there is provided a reading device including a first illuminating section that illuminates a reading area with first illumination light of a first direction, the reading area having a width that is larger than a width of a medium on which an image is formed; a second illuminating section that illuminates the reading area with second illumination light of a second direction; a light-receiving section that receives reflection light of the first illumination light and reflection light of the second illumination light reflected from the reading area, the first illumination light being applied from the first illuminating section and the second illumination light being applied from the second illuminating section; and reflecting members that are disposed side by side in the reading area in a widthwise direction thereof, the reflecting members having a corresponding one of a first reflecting surface and a second reflecting surface, the first reflecting surface reflecting the first illumination light towards the light-receiving section and intercepting the second illumination light that propagates towards the first reflecting surface, the second reflecting surface reflecting the second illumination light towards the light-receiving section and intercepting the first illumination light that propagates towards the second reflecting surface.

BRIEF DESCRIPTION OF THE DRAWINGS

An exemplary embodiment of the present invention will be described in detail based on the following figures, wherein.

DETAILED DESCRIPTION

1. Exemplary Embodiment

1-1. Overall Structure

A reading device 9 according to an exemplary embodiment of the present invention will hereunder be described. In the specification and drawings, in order to illustrate the disposition of each structural member of the reading device 9, a space in which each structural member is disposed is one that is based on a right-handed xyz coordinate system. Of the illustrated coordinate system symbols, a circle whose inner side is white and having a black dot therein represents an arrow extending from a far side to a near side in the plane of the corresponding figure. The directions along an x axis in the space are x-axis directions. Of the x-axis directions, the direction in which an x component increases is a +x direction, and the direction in which the x component decreases is a −x direction. Of the y-axis directions, the direction in which a y component increases is defined as a +y direction and the direction in which the y component decreases is defined as a −y direction. Of the z-axis directions, the direction in which a z component increases is defined as a +z direction and the direction in which the z component decreases is defined as a −z direction.

Figure 1:
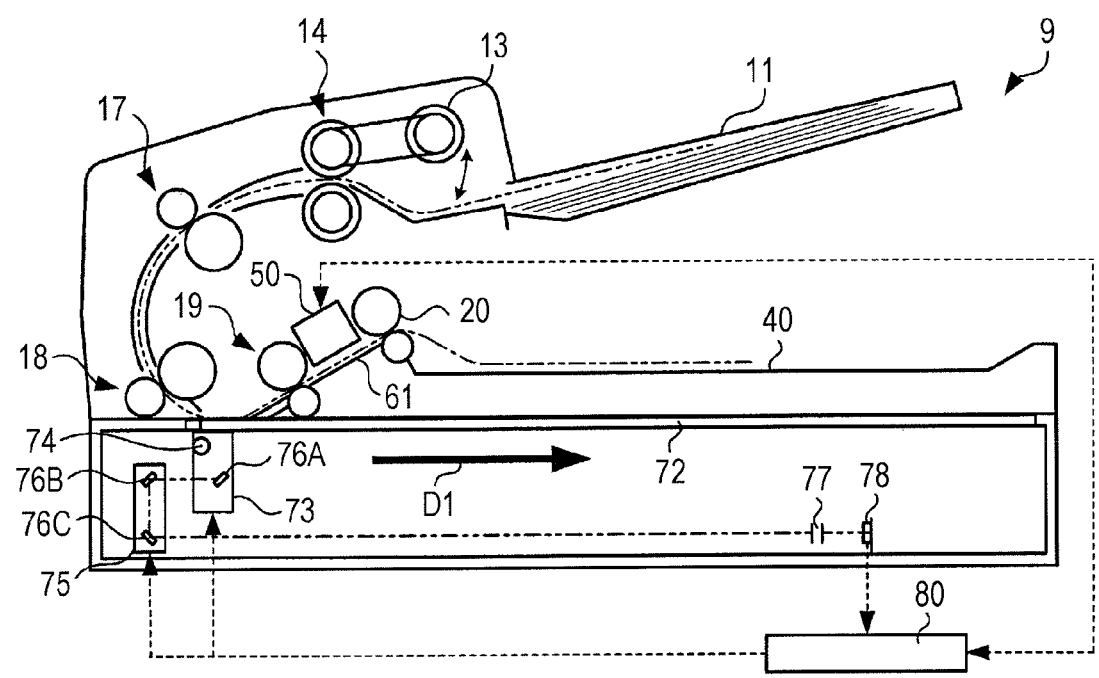
FIG. 1 illustrates an overall structure of a reading device according to an exemplary embodiment of the present invention.

FIG. 1 illustrates an overall structure of the reading device 9 according to the exemplary embodiment of the present invention. Originals are loaded in a container 11, and are media on whose surfaces images are recorded, such as pieces of paper and sheet plastics. The term "images" refers to, for example, photographs, characters, and line drawings. A delivery roller 13 is lifted up and maintained at a withdrawal position during standby, and is lowered to a nip position (original transport position) during transport of an original. The delivery roller 13 that is lowered to the nip position separates one at a time topmost originals from a bundle of originals loaded in the container 11. A feed roller 14 transports further downstream an original transported by the delivery roller 13. Pre-registration rollers 17 transport the original along a guide to downstream rollers, and form loops in the original. More specifically, the pre-registration rollers 17 cause a leading edge of the original to abut upon registration rollers 18 that are stationary, to form a loop in the original. After stopping once, the registration rollers 18 start rotating again in accordance with a timing, and transport the original while performing registration with respect to a position where the original is read at an original table 72. The original transported from the registration rollers 18 is pressed against the original table 72. Of the surfaces of the original, the surface that contacts the original table 72 by being pressed against the original table 72 is called a first surface. Of the surfaces of the original, the surface that is at a side opposite the first surface is called a second surface.

A full rate carriage 73 is provided with an illuminating lamp 74 and a first mirror 76A. The illuminating lamp 74 illuminates an original pressed against the original table 72 with light. The first mirror 76A deflects the light reflected from the original towards a second mirror 76B. A half plate carriage 75 is provided with the second mirror 76B and a third mirror 76C that guide the light reflected from the first mirror 76A towards an imaging section. The imaging lens 77 images the reflected light guided from the third mirror 76 on a charge coupled device (CCD) image sensor 78. The CCD image sensor 78 photoelectrically converts an optical image imaged by the imaging lens 77. Therefore, the image formed on the first surface of the original is read from therebelow, so that image data corresponding to the read image is generated by a controller 80. The controller 80 includes a central processing unit (CPU), read only memory (ROM), and random access memory (RAM). For example, a computer program stored in ROM is read out by RAM and executed by the CPU, so that each portion of the reading device 9 is controlled.

The reading device 9 includes a structural member that reads, in addition to originals loaded in the container 11, originals that are directly placed on the original table 72 so as to be stationary. When an original placed on the original table 72 so as to be stationary is read, the controller 80 of the reading device 9 moves the full rate carriage 73 and the half rate carriage 75 in a scanning direction (in the direction of arrow D1 shown in FIG. 1) in a ratio of 2 to 1, to read one page of the original. In contrast, as mentioned above, when an original loaded in the container 11 is transported to the original table 72, the reading device 9 reads an image formed on the first surface of the transported original without moving the full rate carriage 73 and the half rate carriage 75 in the direction of arrow D1.

Second feed rollers 19 transport the original whose image on its first surface has been read by the CCD image sensor 78 to the vicinity of a contact image sensor (CIS) 50. The CIS 50 reads an image formed on the second surface of the original transported to the second feed rollers 19. Outer rollers 20 are disposed downstream of the CIS 50 in the direction of transport of the original. A guide 61 is provided between the second feed rollers 19 and the outer rollers 20. The original is discharged from the second feed rollers 19, and is supported from its first surface until the original is moved into a portion between the outer rollers 20. An accumulating section 40 is an area where originals whose both surfaces have been read are accumulated. The outer rollers 20 discharge the original whose image on its second surface has been read by the CIS 50 towards the accumulating section 40.

1-2. Structure of CIS

Figure 2:
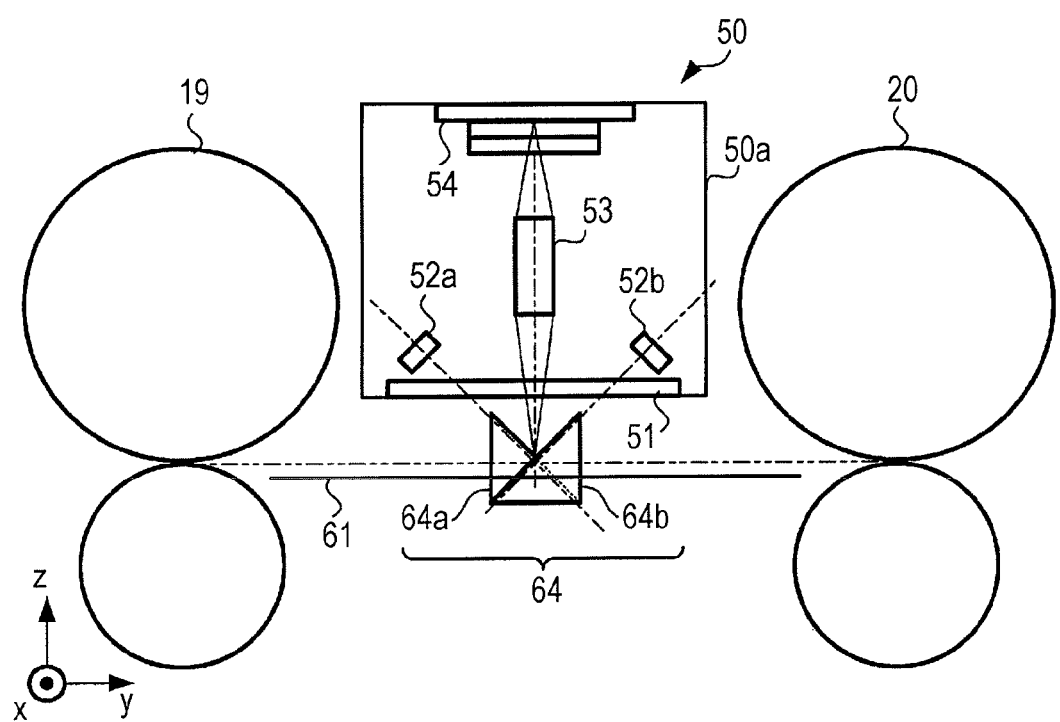
FIG. 2 illustrates a reading structure using a CIS.

FIG. 2 illustrates a reading structure using the CIS 50. In the description below, a right-handed xyz coordinate system is used. In the right-handed xyz coordinate system, a direction in which an original is transported along the guide 61, provided between the second feed rollers 19 and the outer rollers 20, is a y-axis direction, and a widthwise direction of the original is an x-axis direction. As shown in FIG. 2, the CIS 50 is provided between the second feed rollers 19 and the outer rollers 20. The CIS 50 reads the image on the second surface of the original from an opposite side (the +z direction side) of the guide 61 through a transport path along which the original is transported.

When performing, for example, high-speed reading, high-gradation reading, and high optical density reading, it is necessary to increase the illuminance of a reading surface. When there are irregularities at the reading surface, it may be difficult to read an image because a shadow is produced depending upon the angle of incidence of light. Therefore, the CIS 50 includes two illuminating units 52 (52a, 52b), and reads the image by illuminating the original with light from two directions. The CIS 50 includes a housing 50a, a glass 51, and the illuminating units 52a and 52b (when the illuminating units 52a and 52b do not need to be particularly distinguished, they will be generally called "illuminating units 52"). The glass 51 is mounted to an opening formed in a transport-path side of the housing 50a. The illuminating units 52a and 52b illuminate the second surface of the original with light transmitted through the glass 51.

The CIS 50 includes a gradient index lens array 53 that converges lights applied from the illuminating units 52 and reflected from the second surface of the original. The gradient index lens array 53 is disposed so as to be interposed between the two illuminating units 52 along the y-axis directions. That is, the illuminating unit 52a is disposed upstream from the gradient index lens array 53 in the transport direction of the original (that is, at the −y-direction side of the gradient index lens array 53), and the illuminating unit 52b is disposed downstream of the gradient index lens array 53 in the transport direction of the original (that is, at the +y-direction side of the gradient index lens array 53). In a line sensor 54, photodetectors are disposed along the x-axis directions in FIG. 2, and are disposed on a locus of light passing through the gradient index lens array 53. The photodetectors receive the light converged by the gradient index lens array 53, so that the line sensor 54 reads the light reflected from the original. An analog image data signal obtained by the reading is converted into a digital image signal, and sent to the controller 80. A "reading area" for reading the reflected light by the line sensor 54 has a width that is larger than the width of the original.

Figure 3:
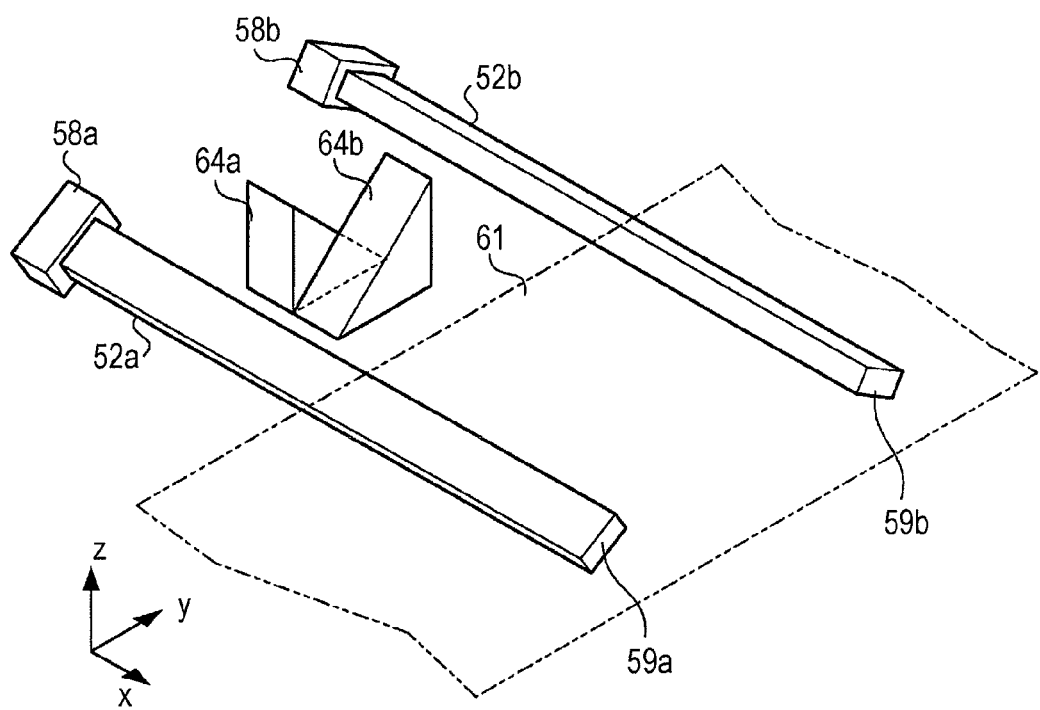
FIG. 3 illustrates a disposition of illuminating units.

FIG. 3 illustrates a disposition of the illuminating units 52. As shown in FIG. 3, the illuminating units 52 are rod-shaped members disposed so that their longitudinal direction is along an x-axis direction. Light emitting diodes 58a and 58b, serving as light sources, are disposed at corresponding end portions at a −x-direction side. The light emitting diodes (LEDs) 58a and 58b will hereunder be generically referred to as "LEDs 58" when they do not need to be particularly distinguished. Reflecting plates 59a and 59b are disposed at corresponding end portions of the illuminating units 52 at a +x-direction side. The reflecting plates 59a and 59b will hereunder be generally referred to as "reflecting plates 59" when they do not need to be particularly distinguished.

CCD image sensors and complementary metal oxide semiconductor image sensors, using photodetectors, are applied to the line sensor 54. Since, in the CIS 50, an image is loaded using the gradient index lens array 53 and the line sensor 54 and without using a reduction optical system, the structure is simple, and a housing is reduced in size. When a color image is read, a 3 line color image sensor including pixel arrays for three colors (R, G, and B) is used as the line sensor 54, with LED light sources of three colors, red (R), green (G), and blue (B), being used in combination for the LEDs 58, or white LED light sources being used for the LEDs 58.

Figure 4:
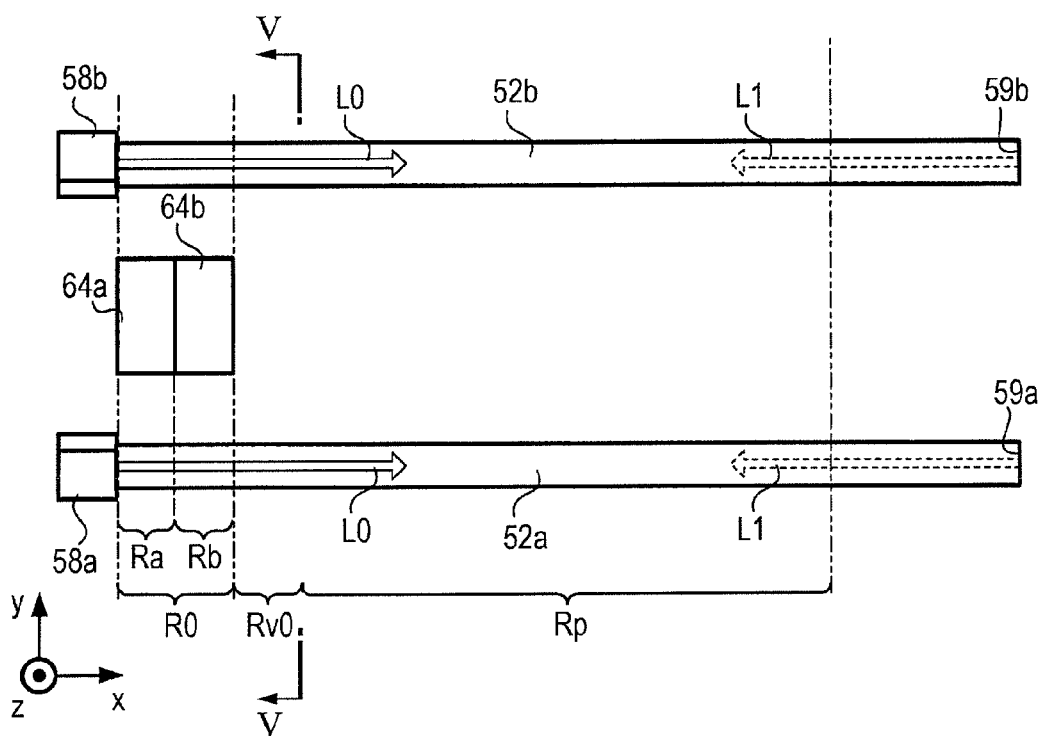
FIG. 4 shows the illuminating units from where a gradient index lens array is disposed.

FIG. 4 shows the illuminating units 52 in a direction from where the gradient index lens array 53 is disposed to the guide 61 (that is, in the −z direction). Light-guiding members of the illuminating units 52 are formed of, for example, acryl and have their inner sides subjected to a special process. Light that propagates in the direction of arrow L0 from each LED 58, and the light reflected by each reflecting plate 59 and that propagates in the direction of arrow L1 are reflected at inner portions. Each light is emitted from, of light-guiding surfaces of its corresponding illuminating unit 52, the light-guiding surface of its corresponding illuminating unit 52 facing the guide 61, and illuminates the second surface of an original transported onto the guide 61.

As shown in FIGS. 3 and 4, triangular prisms 64a and 64b are disposed within the aforementioned reading area at the −x-direction side of the guide 61. That is, the triangular prisms 64a and 64b are disposed side by side in the reading area in a widthwise direction thereof. The triangular prisms 64a and 64b will hereunder be generally called "triangular prisms 64" when they do not need to be particularly distinguished. Each triangular prism 64 is, for example, a triangular prism having a cross section of an isosceles right-angled triangle. The triangular prisms 64 are disposed so that their cross sections are perpendicular to the x-axis directions. White reference tapes are applied to surfaces of the triangular prisms 64, with biaxially stretched polyester films being used at the surfaces. The surfaces include oblique sides of the isosceles right-angled triangles (cross sections) and extend in an x-axis direction. Each white reference tape is a white tape. Visible light that propagates towards and illuminates the surfaces to which the white reference tapes are applied are diffused and reflected almost without being absorbed. A portion of the reflected light is reflected towards the line sensor 54, so that this portion of the reflected light is converged by the gradient index lens array 53. Each surface to which the white reference tape is applied is called a "white reference surface." The white reference surface of the triangular prism 64a is oriented by a greater amount towards the illuminating unit 52b than the second surface of the original. The white reference surface of the triangular prism 64a reflects light applied from the illuminating unit 52b towards the line sensor 54, and is such that light applied from the illuminating unit 52a is not incident thereupon. That is, the light applied from the illuminating unit 52a towards the white reference surface of the triangular prism 64a is intercepted by a side surface of the triangular prism 64a extending in a z direction. The white reference surface that reflects the light (first illumination light) applied from the illuminating unit 52b towards the line sensor 54 (a light-receiving section), and that is such that the light (second illumination light) applied from the illuminating unit 52a is not incident thereupon is called a "first reflecting surface."

The white reference surface of the triangular prism 64b is oriented by a greater amount towards the illuminating unit 52a than the second surface of the original. The white reference surface of the triangular prism 64b reflects light applied from the illuminating unit 52a towards the line sensor 54, and is such that light applied from the illuminating unit 52b is not incident thereupon. That is, the light applied from the illuminating unit 52b towards the white reference surface of the triangular prism 64b is intercepted by a side surface of the triangular prism 64b extending in a z direction. The white reference surface that reflects the light (second illumination light) applied from the illuminating unit 52a towards the line sensor 54 (the light-receiving section), and that is such that the light (first illumination light) applied from the illuminating unit 52b is not incident thereupon is called a "second reflecting surface."

The triangular prisms 64a and 64b function as reflecting members having the corresponding one of the first and second reflecting surfaces and disposed side by side in the reading area of the reading device 9 in a widthwise direction thereof. The first reflecting surface of the reflecting member reflects the first illumination light towards the light-receiving section, and intercepts the second illumination light that propagates towards the first reflecting surface. The second reflecting surface of the reflecting member reflects the second illumination light towards the light-receiving section, and intercepts the first illumination light that propagates towards the second reflecting surface.

Each triangular prism 64 has the white reference surface to which the white reference tape is applied. When the entire visible-light area of the illumination light does not need to be measured, for example, when an image formed on an original is read by illuminating the original with light of a specific wavelength band, such as infrared rays, a tape that reflects the light of the wavelength band is applied to a surface of each triangular prism 64, to define a reference surface. That is, the color of the reference surface is not limited to white.

Figure 5A:
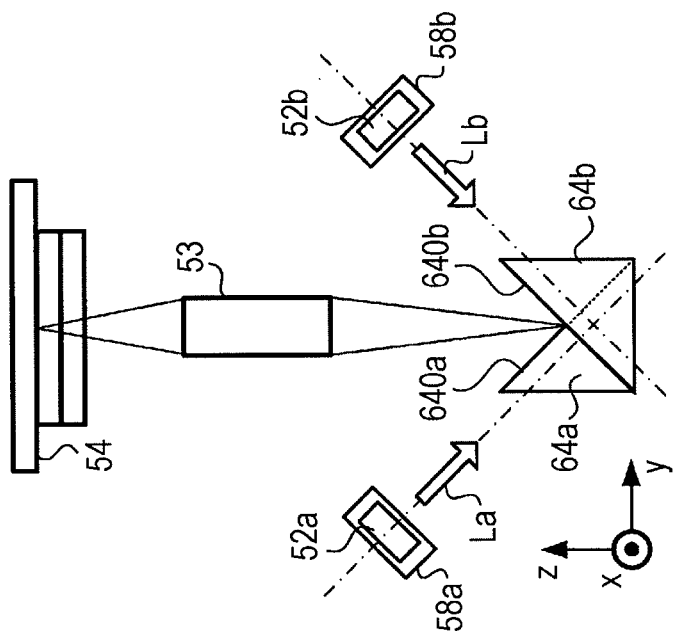
FIGS. 5A and 5B each illustrate light that is reflected by each triangular prismatic white reference surface.
Figure 5B:
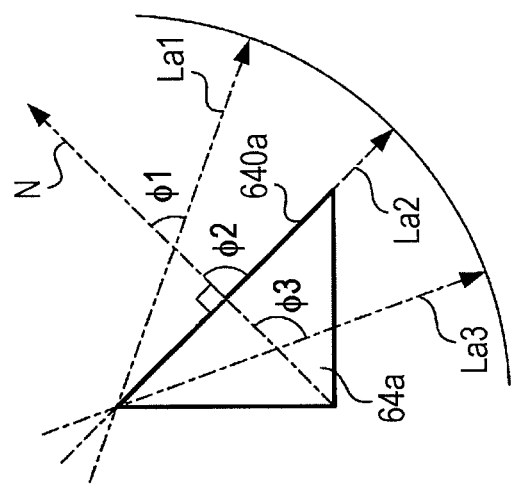

FIGS. 5A and 5B each illustrate light that is reflected by each triangular prismatic white reference surface. FIG. 5A shows each triangular prism 64 viewed from the direction of arrow V-V shown in FIG. 4. As described above, a white reference surface 640a (first reflecting surface) of the triangular prism 64a is oriented by a greater amount towards the illuminating unit 52b than the second surface of an original. Therefore, the white reference surface 640a reflects towards the line sensor 54 by a certain proportion or more light applied in the direction of arrow Lb (first direction) from the illuminating unit 52b (first illuminating section). In contrast, the white reference surface 640a is not oriented by a greater amount towards the illuminating unit 52a (second illumination section) than the second surface of an original. An angle formed between the direction of arrow La along which the illuminating unit 52a emits the light (second direction) and a normal vector to the white reference surface 640a is less than or equal to 90 degrees as described below. That is, the white reference surface 640a is oriented in the direction in which the light that propagates in the direction of arrow La is intercepted. Therefore, the light applied from the illuminating unit 52a in the direction of arrow La is intercepted and is not incident upon the white reference surface 640a.

Here, a range in the direction of arrow La corresponding to a light illumination direction in which light does not strike the white reference surface 640a will be described with reference to FIG. 5B. FIG. 5B shows, among the structural features shown in FIG. 5A, the relationship between the triangular prism 64a and the direction of arrow La. Here, in order to describe the range in the direction of arrow La, FIG. 5B shows three directions, that is, the direction of arrow La1, the direction of arrow La2, and the direction of arrow La1. In addition, FIG. 5B shows the direction of arrow N as the direction of the normal vector to the white reference surface 640a of the triangular prism 64a.

The angle formed between the direction of arrow N and the direction of arrow La1 is $\phi1$. The angle $\phi$ is less than 90 degrees. In this case, light that propagates in the direction of arrow La1 does not strike the white reference surface 640a. That is, the direction of arrow La1 that forms the angle $\phi1$ with the direction of arrow N (the direction of the normal vector to the white reference surface 640a) that is less than 90 degrees is included in the range in the direction of arrow La corresponding to the light illumination direction in which the light does not strike the white reference surface 640a.

The angle formed between the direction of arrow N and the direction of arrow La2 is $\phi2$. The angle $\phi2$ is 90 degrees. In this case, since the light that propagates in the direction of arrow La2 propagates along the surface of the white reference surface 640a, the light does not strike the white reference surface 640a. That is, the direction of arrow La2 which forms the angle $\phi2$ with the direction of arrow N that is 90 degrees is included in the range in the direction of arrow La corresponding to the light illumination direction in which light does not strike the white reference surface 640a.

The angle formed between the direction of arrow N and the direction of arrow La3 is $\phi3$. The angle $\phi3$ is greater than 90 degrees. In this case, since the light that propagates in the direction of arrow La3 propagates towards the surface of the white reference surface 640a, the light strikes the white reference surface 640a. That is, the direction of arrow La3 that forms the angle φ3 with the direction of arrow N that is greater than 90 degrees is not included in the range in the direction of arrow La corresponding to the light illumination direction in which the light does not strike the white reference surface 640a.

That is, the direction of arrow La corresponding to the light illumination direction in which the light does not strike the white reference surface 640a is a direction in which the angle formed with respect to the normal vector to the white reference surface 640a is less than or equal to 90 degrees.

The white reference surface 640b (second reflecting surface) of the triangular prism 64b is oriented by a greater amount towards the illuminating unit 52a (second illuminating section) than the second surface of an original. Therefore, light applied from the illuminating unit 52a in the direction of arrow La (second direction) is reflected towards the line sensor 54 by a certain proportion or more. In contrast, the white reference surface 640b is not oriented by a greater amount towards the illuminating unit 52b (first illuminating section) than the second surface of an original. The angle formed between the normal vector to the white reference surface 640b and the direction of arrow Lb in which the illuminating unit 52b applies light (first direction) is less than or equal to 90 degrees as mentioned above. That is, the white reference surface 640b is oriented in a direction in which light that propagates in the direction of arrow Lb is intercepted. Therefore, the light applied from the illuminating unit 52b in the direction of arrow Lb is intercepted and is not incident upon the white reference surface 640b.

Figure 6A:
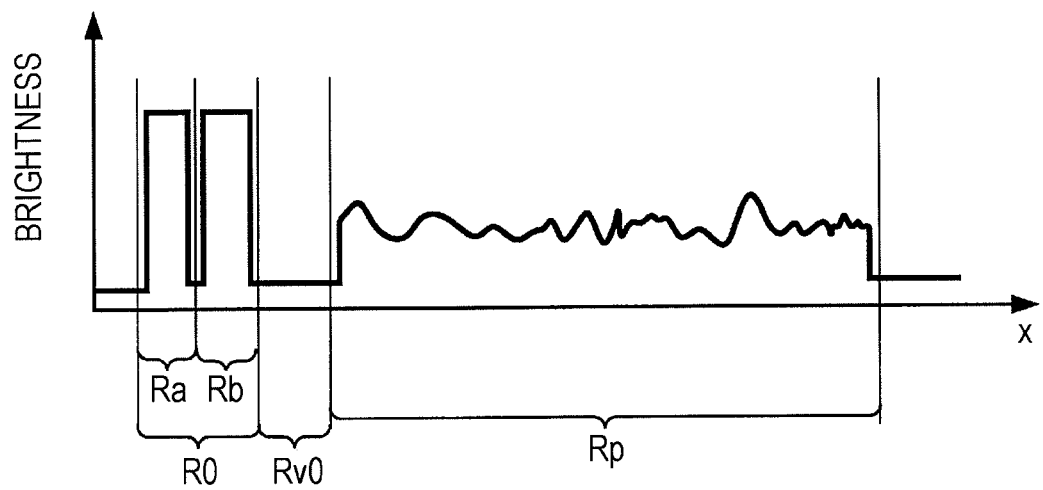
FIGS. 6A and 6B each illustrate an exemplary analog image data signal.
Figure 6B:
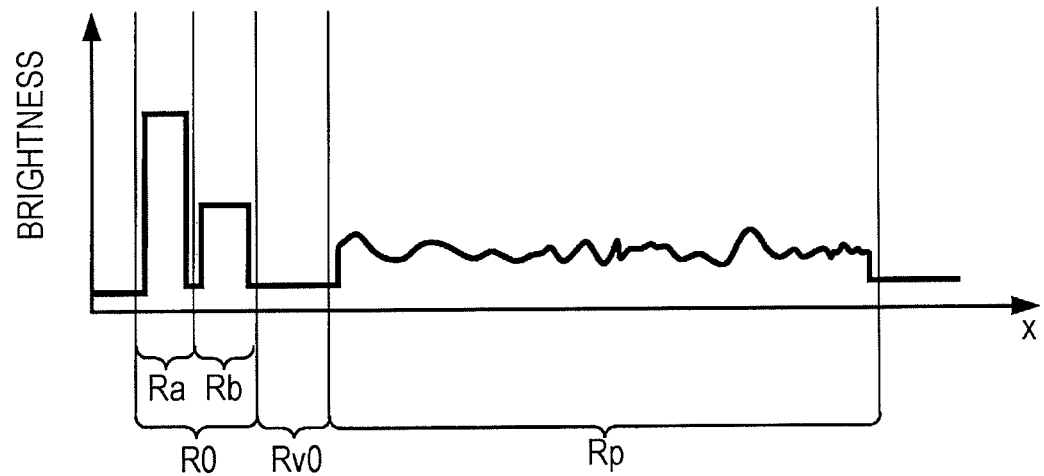

FIGS. 6A and 6B each illustrate an exemplary analog image data signal obtained when the line sensor 54 reads light converged by the gradient index lens array 53. In each of FIGS. 6A and 6B, the horizontal axis represents positions along an x axis, and the vertical axis represents the brightness of light represented by the analog image data signal. An image is formed on the second surface of an original that is supported and transported by the guide 61. When the original passes through an area Rp shown in FIG. 4, a distribution of brightness in accordance with the image formed on the second surface is capable of being obtained as shown in FIG. 6A. Here, the guide 61 exists and an image does not exist in an area Rv0 and an area Rv1 on respective sides of the area Rp in an x axis direction. When, for example, a coating material that makes it difficult to reflect light is applied to the surface of the guide 61 that supports the original, as shown in FIG. 6A, the brightnesses in the areas Rv0 and Rv1 observed by the line sensor 54 are lower than the brightness in the area Rp.

An area R0 is where the triangular prisms 64a and 64b exist closer to the −x-direction side than the area Rv0. Of areas in the area R0, the area where the triangular prism 64a is disposed is the area Ra, and the area where the triangular prism 64b is disposed in the area Rb.

In the area Ra, light applied from the illuminating unit 52b is diffused and reflected by the white reference surface 640a of the triangular prism 64a, is converged by the gradient index lens array 53, and reaches the line sensor 54. In contrast, in the area Ra, light applied from the illuminating unit 52a is not incident upon the white reference surface 640a. Therefore, the brightness observed by the line sensor 54 in the area Ra is that of the light emitted from the LED 58b serving as a light source of the illuminating unit 52b.

In the area Rb, light applied from the illuminating unit 52a is diffused and reflected by the white reference surface 640b of the triangular prism 64b, is converged by the gradient index lens array 53, and reaches the line sensor 54. In contrast, in the area Rb, light applied from the illuminating unit 52b is not incident upon the white reference surface 640b. Therefore, the brightness observed by the line sensor 54 in the area Rb is that of the light emitted from the LED 58a serving as a light source of the illuminating unit 52a.

Here, when a change occurs in the LED 58a due to some reason, and the quantity of light that is output is reduced, a profile of the brightness observed by the line sensor 54 varies as shown in, for example, FIG. 6B. In the profile shown in FIG. 6B, the brightness in the area Rb is less than the brightness shown in FIG. 6A with the brightness in the area Ra being maintained to the brightness shown in FIG. 6A.

In the area Ra, since the line sensor 54 observes the brightness produced by the light emitted from the LED 58b, the observed brightness is not influenced by changes occurring in the LED 58a. In contrast, in the area Rb, since the line sensor 54 observes the brightness produced by the light emitted from the LED 58a, the observed brightness is influenced by changes occurring in the LED 58a. Therefore, it is understood that, when the line sensor 54 observes a chart shown in FIG. 6B, changes occur in the LED 58a instead of in the LED 58b. Consequently, the controller 80 of the reading device 9 increases electric current that is supplied to the LED 58a in accordance with this chart without changing the electric current that is supplied to the LED 58b. For example, when the line sensor 54 observes the profile shown in FIG. 6B, the controller 80 increases the electric current that is supplied to the LED 58a in accordance with the reduced brightness in the area Rb. This causes the controller 80 to control the LED 58a so that the quantity of light that is output approaches that prior to the change. When the line sensor 54 observes the profile in which the brightness is reduced in the area Ra, which is in contrast to the chart shown in FIG. 6B, the controller 80 increases the electric current that is supplied to the LED 58b in accordance with the reduced brightness. This causes the controller 80 to control the LED 58b so that the quantity of light that is output approaches that prior to the change.

That is, in accordance with a change in the quantity of light reflected from the triangular prism 64a and received by the photodetector opposing the triangular prism 64a among the photodetectors of the line sensor 54, the controller 80 controls the illuminating unit 52b so that the quantity of light applied from the illuminating unit 52b approaches that prior to the change. In addition, in accordance with a change in the quantity of light reflected from the triangular prism 64b and received by the photodetector opposing the triangular prism 64b among the photodetectors of the line sensor 54, the controller 80 controls the illuminating unit 52a so that the quantity of light applied from the illuminating unit 52a approaches that prior to the change. This causes the controller 80 to adjust the balance between the light output from the LED 58a and the light out from the LED 58b.

In the related art, for example, a member corresponding to the guide 61 has a white reference surface. Lights emitted from the light sources corresponding to the illuminating units 52a and 52b are mixed and reflected by the white reference surface. Therefore, even if the brightness of the light detected by the line sensor is reduced in an area corresponding to the white reference surface, a user is not capable of knowing which light source has had its light weakened. Therefore, in the related art, when the brightness is reduced in the area corresponding to the white reference surface, the quantities of electric current supplied to both light sources are uniformly increased. Consequently, excessive electric current is supplied to, for example, the LED serving as the light source in which changes do not occur, thereby reducing the life of the LED. When a dedicated sensor is provided for each of the light sources, and the light quantity is monitored, the system becomes complicated, thereby increasing manufacturing costs.

In the reading device 9, two types of white reference surfaces that individually diffuse and reflect the light applied from the illuminating unit 52a and the illuminating unit 52b so that they do not mix with each other are provided. Therefore, the line sensor 54 observes the brightness, to detect in which of the two LEDs 58 an abnormality is occurring. The controller 80 adjusts the LED 58 in which an abnormality is occurring, to maintain the lights output from the two LEDs 58 in a balanced state.

2. Modification

An exemplary embodiment is described above. The content of the exemplary embodiment may be modified as follows. The following modifications may be combined.

2-1. Form of Member Having White Reference Surface

Figure 7:
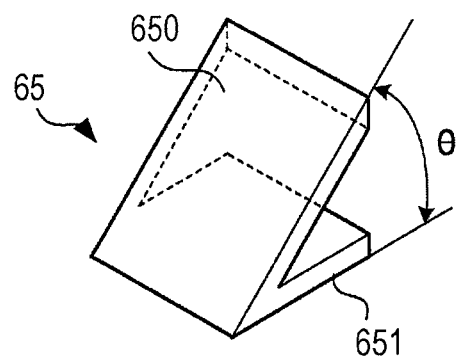
FIG. 7 illustrates an exemplary form of a member including a white reference surface in a modification.

Although, in the above-described exemplary embodiment, the member having a white reference surface is a triangular prism having a cross section of an isosceles right-angled triangle, the member having a white reference surface may have another form. FIG. 7 illustrates an exemplary form of a member including a white reference surface in a modification. A member 65 has a form that is formed by bonding a first plate and a second plate so that the angle formed between the first plate and the second plate is θ (0<θ<90 degrees). The first plate has a surface 651 that is parallel to a surface of the guide 61. The second plate has a white reference surface 650. When the member 65 is used, the white reference surface 650 is disposed so that light applied from one of the two illuminating units 52 is reflected towards the line sensor 54, and so that light from the other of the two illuminating units 52 is intercepted. In short, the member only needs to have a reflecting surface that reflects the light applied from one of the two illuminating units 52 towards the light-receiving section, and intercepts the light applied from the other of the two illuminating units 52.

2-2. Light-Intercepting Plate

Figure 8:
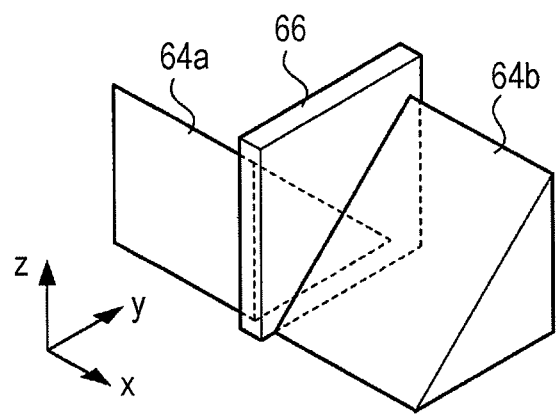
FIG. 8 illustrates an exemplary light-intercepting plate in a modification.

Although, in the above-described exemplary embodiment, the triangular prisms 64, such as the triangular prism 64a and the triangular prism 64b, having different loci of lights that are reflected are disposed continuously side by side in an x-axis direction, a light-intercepting member may be provided between the triangular prisms 64. FIG. 8 illustrates an exemplary light-intercepting plate (light-intercepting member) in a modification. A light-intercepting plate 66 shown in FIG. 8 is provided between the triangular prism 64a and the triangular prism 64b. Of the lights applied from the illuminating units 52, the light that propagates in a direction including an x-axis-direction component is intercepted by the light-intercepting plate 66 shown in FIG. 8. That is, the light-shielding plate 66 intercepts the light applied from the illuminating unit 52a to the triangular prism 64a, and intercepts the light applied from the illuminating unit 52b to the triangular prism 64b. By this, each triangular prism 64 is disposed so that its white reference surface reflects the light applied from one of the two illuminating units towards the line sensor 54, and intercepts the light applied from the other of the two illuminating units 52.

2-3. Mixture of Light

Figure 9:
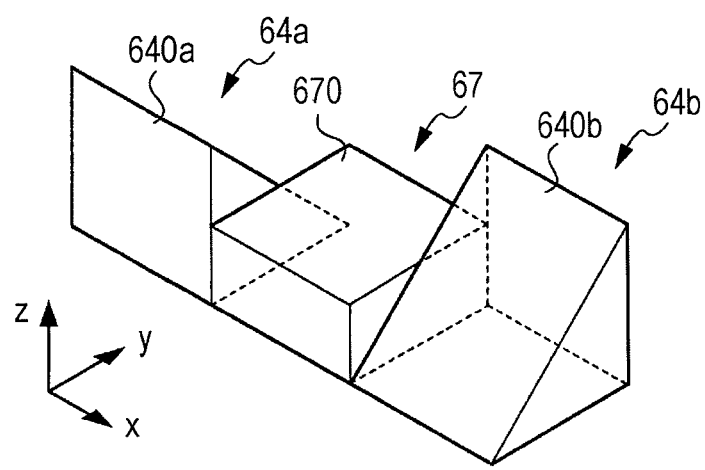
FIG. 9 illustrates an exemplary quadrangular prism in a modification.

Although, in the above-described exemplary embodiment, the reading device includes triangular prisms 64 having different loci of lights that are reflected, the reading device may further include a member that reflects both lights reflected by the corresponding triangular prisms 64. For example, a quadrangular prism may be disposed between the triangular prism 64a and the triangular prism 64b. FIG. 9 illustrates an exemplary quadrangular prism 67 in a modification. The quadrangular prism 67 has a white reference surface 670 that is substantially parallel to a surface of the guide 61 (see FIG. 2). The white reference surface 670 diffuses and reflects the lights from the two illuminating units 52. Therefore, these lights are mixed and converged by the gradient index lens array 53, and reach the line sensor 54. Even in this case, the white reference surface 640a (disposed so that the light applied from one of the two illuminating units 52 is reflected towards the line sensor 54 and so that the light applied from the other of the two illuminating units 52 is intercepted) and the white reference surface 640b (disposed so that the light applied from the other of the two illuminating units 52 is reflected towards the line sensor 54 and so that the light applied from the one of the two illuminating units 52 is intercepted) are provided, the changes in the quantities of the lights output from the two LEDs 58 are separately observed, as a result of which the balance between the light quantities is adjusted.

2-4. White Reference Surface in which Inclination Angle Changes

Although, in the above-described modification, only one quadrangular prism 67 is provided between the triangular prism 64a and the triangular prism 64b, multiple members may be disposed side by side between these two triangular prisms 64. For example, members having inclination angles that are intermediate between the inclination angles at a yz plane of the white reference surfaces may be disposed between the quadrangular prism 67 and the triangular prism 64a. That is, although the inclination angles in the yz plane of the white reference surfaces 640a, 670, and 640b shown in FIG. 9 differ in three steps, they may differ in four or more steps.

Figure 10:
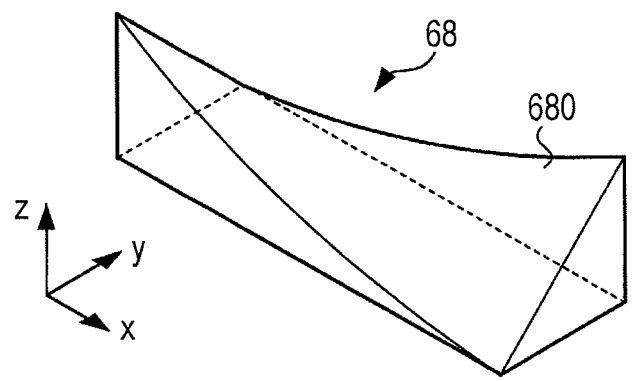
FIG. 10 illustrates an exemplary member in a modification.

The inclination angles of the corresponding white reference surfaces in the yz plane may differ continuously in an x-axis direction. FIG. 10 illustrates an exemplary member 68 in a modification. The member 68 has a curved surface 680 whose inclination angle in the yz plane changes in an x-axis direction. With the curved surface 680 being defined as a white reference surface, light reflected in an area of an end portion in the member 68 in the +x direction and light reflected in an area of an end portion of the member 68 in the −x direction are detected by the line sensor 54, so that changes in the quantities of lights output from the two LEDs 58 are separately monitored.

2-5. Light-Intercepting Plate Disposed Along Illuminating Unit

Although, in the above-described exemplary embodiment, the reading device 9 includes the triangular prism 64a (in which the inclination angle of the white reference surface is such that the white reference surface of the triangular prism 64a is oriented by a greater amount towards the illuminating unit 52b than the second surface of an original) and the triangular prism 64b (in which the inclination angle of the white reference surface is such that the white reference surface of the triangular prism 64b is oriented by a greater amount towards the illuminating unit 52a than the second surface of the original), these triangular prisms 64 may be replaced by light-intercepting members disposed along the illuminating units 52.

Figure 11A:
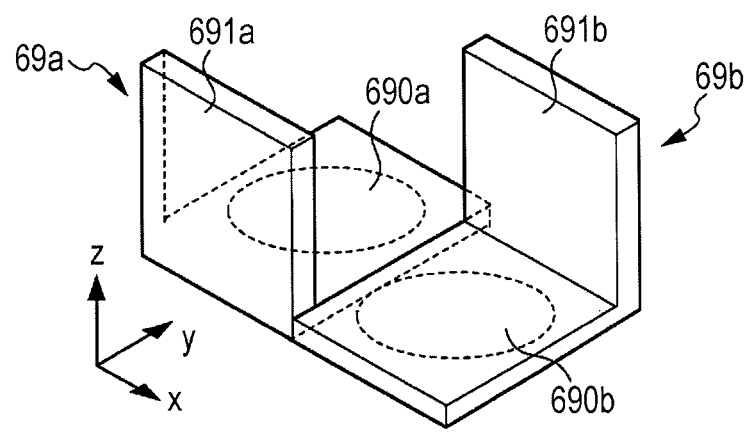
FIGS. 11A and 11B each illustrate exemplary light-intercepting members in a modification.
Figure 11B:
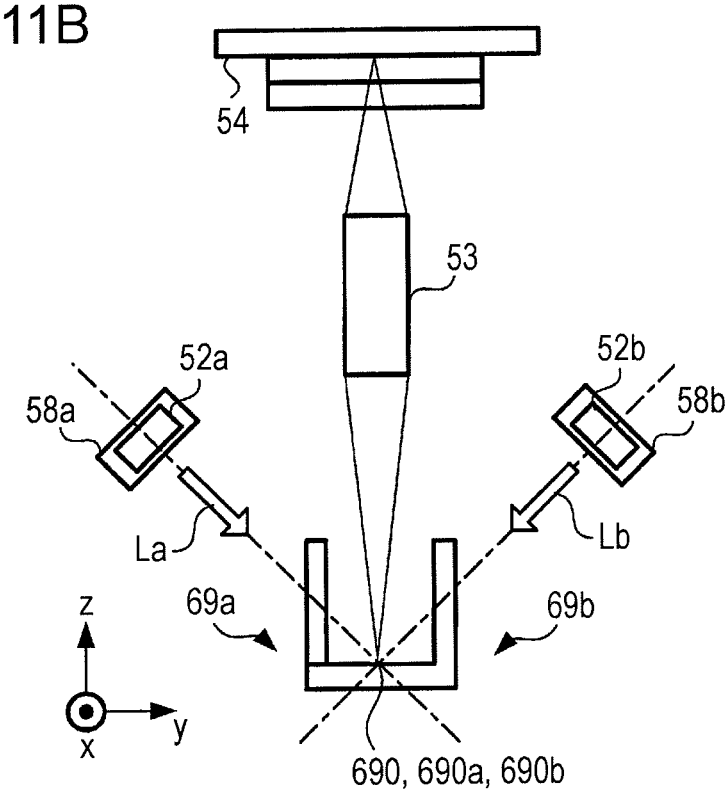

FIG. 11 illustrates exemplary light-intercepting members 69a and 69b in a modification (when the light-intercepting members 69a and 69b do not need to be particularly distinguished, they will hereunder be generally called "light-intercepting members 69"). As shown in FIG. 11A, in this modification, the light-intercepting members 69 are used instead of the triangular prisms 64. Each light-intercepting member 69 is an L-shaped member formed by attaching a plate that is parallel to an xy plane and a plate that is parallel to a zx plane. The surface that is disposed in the +z direction of the plate parallel to the xy plane is a white reference surface to which a white reference tape using a biaxially stretched polyester film is applied. As shown in FIG. 11B, since a light-intercepting plate 691a of the light-intercepting member 69 intercepts light applied from an illuminating unit 52a in the direction of arrow La, this light is not incident upon a white reference surface 690a of the light-intercepting member 69a. As shown in FIG. 11B, since a light-intercepting plate 691b of the light-intercepting member 69b intercepts light applied from an illuminating unit 52b in the direction of arrow Lb, this light is not incident upon a white reference surface 690b of the light-intercepting member 69b. Therefore, the white reference surface 690a reflects only the light applied from the illuminating unit 52b in the direction of arrow Lb towards the line sensor 54, and the white reference surface 690b reflects only the light directed from the illuminating unit 52a in the direction of arrow La towards the line sensor 54.

The above-described white reference surface 690a and white reference surface 690b may be provided on a surface of one continuous plate. In this case, this plate and the light-intercepting plate 691a correspond to the light-intercepting member 69a, and this plate and the light-intercepting plate 691b correspond to the light-intercepting member 69b.

2-6. LED

Although, in the above-described exemplary embodiment, each LED 58 is provided at the −x-direction-side end portion of its corresponding illuminating unit 52, each LED 58 may be provided at the +x-direction-side end portion of its corresponding illuminating unit 52. In addition, although, in the above-described exemplary embodiment, each reflecting plate 59 is provided at an end portion at a side opposite the side where the corresponding LED 58 is provided in an x-axis-direction, a different light source may be provided in place of each reflecting plate 59. That is, a light source, such as a LED, may be provided at an end of each illuminating unit 52 in an x-axis direction. In this case, a triangular prism 64c and a triangular prism 64d may be added and set at a side in the +x direction of the guide 61 within the range of the reading area. The triangular prism 64c has a white reference surface that reflects light applied from the illuminating unit 52b towards the line sensor 54, and upon which light applied from the illuminating unit 52a is not incident. The triangular prism 64d has a white reference surface that reflects the light applied from the illuminating unit 52a towards the line sensor 54, and upon which the light applied from the illuminating unit 52b is not incident. For example, since the triangular prism 64a is closer to the LED 58a, provided at the −x-direction side of the illuminating unit 52a, than the triangular prism 64c, the brightness that is detected at the area Ra is more easily influenced by changes occurring in the LED 58a than the brightness that is detected at the area Rc. In contrast, since the triangular prism 64c is closer to the LED 58, provided at the +x-direction side of the illuminating unit 52a, than the triangular prism 64a, the brightness that is detected at the area Rc is more easily influenced by changes occurring in the LED 58 than the brightness that is detected at the area Ra. Therefore, on the basis of changes in the quantities of reflected lights from the white reference surfaces of the triangular prisms 64 provided at respective sides of the guide 61 in an x-axis direction, the controller 80 of the reading device 9 may determine in which LED provided at the end portion of the corresponding illuminating unit 52 an abnormality is occurring, to perform control in accordance with this.

2-7. Controller

In the above-described exemplary embodiment, when a change occurs in the profile observed by the line sensor 54, the controller 80 may perform control so that the quantity of light that is output approaches that prior to the change by increasing, in accordance with the amount of change (that is the change in the quantity of illumination light), electric current supplied to the LED 58 in which a change has occurred. However, the controller 80 need not perform this control. For example, when a change occurs in the profile observed by the line sensor 54, the controller 80 may cause this profile to be displayed on a display device (not shown), or may notify a user of the change. In this case, the user who has been notified of the change may replace the LED in which a change has occurred with a new one, to maintain the balance between the quantities of the lights output from the two LEDs 58.

In the above-described exemplary embodiment, when the profile shown in FIG. 6B is observed by the line sensor 54, the controller 80 determines that a change has occurred in the LED 58a instead of the LED 58b, and increases the electric current supplied to the LED 58a and does not change the electric current supplied to the LED 58b. However, the controller 80 may reduce the electric current supplied to the LED 58b. When a chart in which the brightness is reduced in the area Ra, which is in contrast to the profile shown in FIG. 6B, is observed by the line sensor 54, the controller 80 may reduce the electric current supplied to the LED 58a.

In short, in accordance with a change in the quantity of light reflected from the triangular prism 64a and received light by the photodetector opposing the triangular prism 64a among the photodetectors of the line sensor 54, or in accordance with a change in the quantity of light reflected from the triangular prism 64b and received light by the photodetector opposing the triangular prism 64b among the photodetectors of the line sensor 54, the controller 80 controls the light quantities of the LEDs 58a and 58b so that the ratio between the quantities of the lights applied from the corresponding illuminating units 52a and 52b approaches that prior to the change. This causes the controller 80 to adjust the balance between the quantity of light output from the LED 58a and the quantity of light out from the LED 58b.

2-8. Medium

In the above-described exemplary embodiment, the line sensor 54 reads light reflected from an original supported by and transported along the guide 61. However, the medium on which an image read by the line sensor 54 is formed is not limited to the aforementioned original. For example, the line sensor 54 may read, for example, a toner image formed on a surface of the intermediate transfer belt.

Although the original in the above-described exemplary embodiment is transported along the guide 61 in the +y direction, the medium on which an image read by the line sensor 54 is formed need not move. In this case, the CIS 50 and the triangular prisms 64 move along the medium that does not move, and the line sensor 54 of the CIS 50 only needs to read an image formed on a surface of the medium. That is, the medium only needs to move relative to the line sensor 54.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A reading device comprising:
   a first illuminating section that illuminates a reading area with first illumination light of a first direction, the reading area having a width that is larger than a width of a medium on which an image is formed;
   a second illuminating section that illuminates the reading area with second illumination light of a second direction;
   a light-receiving section that receives reflection light of the first illumination light and reflection light of the second illumination light reflected from the reading area, the first illumination light being applied from the first illuminating section and the second illumination light being applied from the second illuminating section; and
   a plurality of reflecting members that are disposed side by side in the reading area in a widthwise direction thereof, the plurality of reflecting members having a corresponding one of a first reflecting surface and a second reflecting surface, the first reflecting surface reflecting the first illumination light towards the light-receiving section and intercepting the second illumination light that propagates towards the first reflecting surface, the second reflecting surface reflecting the second illumination light towards the light-receiving section and intercepting the first illumination light that propagates towards the second reflecting surface.

2. The reading device according to claim 1, wherein an angle that a normal vector to the first reflecting surface forms with the second direction is less than or equal to 90 degrees, and
   wherein an angle that a normal vector to the second reflecting surface forms with the first direction is less than or equal to 90 degrees.

3. The reading device according to claim 2, further comprising a controller that, in accordance with a change in a quantity of the light reflected from the first reflecting surface and received by the light-receiving section, controls the first illuminating section so that a quantity of the first illumination light approaches that prior to the change, and that, in accordance with a change in a quantity of the light reflected from the second reflecting surface and received by the light-receiving section, controls the second illuminating section so that a quantity of the second illumination light approaches that prior to the change.

4. The reading device according to claim 3, further comprising a light-intercepting member that is interposed between the first reflecting surface and the second reflecting surface in the widthwise direction, the light-intercepting member intercepting the second illumination light that is applied towards the first reflecting surface and intercepting the first illumination light that is applied towards the second reflecting surface.

5. The reading device according to claim 2, further comprising a controller that, in accordance with a change in a quantity of the light reflected from the first reflecting surface and received by the light-receiving section, or in accordance with a change in a quantity of the light reflected from the second reflecting surface and received by the light-receiving section, controls a light quantity of the first illuminating section or a light quantity of the second illuminating section so that a ratio between a quantity of the first illumination light and a quantity of the second illumination light approaches that prior to the change.

6. The reading device according to claim 5, further comprising a light-intercepting member that is interposed between the first reflecting surface and the second reflecting surface in the widthwise direction, the light-intercepting member intercepting the second illumination light that is applied towards the first reflecting surface and intercepting the first illumination light that is applied towards the second reflecting surface.

7. The reading device according to claim 2, further comprising a light-intercepting member that is interposed between the first reflecting surface and the second reflecting surface in the widthwise direction, the light-intercepting member intercepting the second illumination light that is applied towards the first reflecting surface and intercepting the first illumination light that is applied towards the second reflecting surface.

8. The reading device according to claim 1, further comprising a controller that, in accordance with a change in a quantity of the light reflected from the first reflecting surface and received by the light-receiving section, controls the first illuminating section so that a quantity of the first illumination light approaches that prior to the change, and that, in accordance with a change in a quantity of the light reflected from the second reflecting surface and received by the light-receiving section, controls the second illuminating section so that a quantity of the second illumination light approaches that prior to the change.

9. The reading device according to claim 8, further comprising a light-intercepting member that is interposed between the first reflecting surface and the second reflecting surface in the widthwise direction, the light-intercepting member intercepting the second illumination light that is applied towards the first reflecting surface and intercepting the first illumination light that is applied towards the second reflecting surface.

10. The reading device according to claim 1, further comprising a controller that, in accordance with a change in a quantity of the light reflected from the first reflecting surface and received by the light-receiving section, or in accordance with a change in a quantity of the light reflected from the second reflecting surface and received by the light-receiving section, controls a light quantity of the first illuminating section or a light quantity of the second illuminating section so that a ratio between a quantity of the first illumination light and a quantity of the second illumination light approaches that prior to the change.

11. The reading device according to claim 10, further comprising a light-intercepting member that is interposed between the first reflecting surface and the second reflecting surface in the widthwise direction, the light-intercepting member intercepting the second illumination light that is applied towards the first reflecting surface and intercepting the first illumination light that is applied towards the second reflecting surface.

12. The reading device according to claim 1, further comprising a light-intercepting member that is interposed between the first reflecting surface and the second reflecting surface in the widthwise direction, the light-intercepting member intercepting the second illumination light that is applied towards the first reflecting surface and intercepting the first illumination light that is applied towards the second reflecting surface.

* * * * *